United States Patent
Ostberg

(10) Patent No.: US 10,289,885 B2
(45) Date of Patent: May 14, 2019

(54) USE FINGERPRINT SENSOR SIGNAL TO PREVENT DEVICE SLEEP

(71) Applicant: Synaptics Incorporated, San Jose, CA (US)

(72) Inventor: Anna Ostberg, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 82 days.

(21) Appl. No.: 15/640,254

(22) Filed: Jun. 30, 2017

(65) Prior Publication Data
US 2019/0005297 A1    Jan. 3, 2019

(51) Int. Cl.
G06K 9/62    (2006.01)
G06K 9/00    (2006.01)
G06K 9/22    (2006.01)

(52) U.S. Cl.
CPC ..... *G06K 9/00013* (2013.01); *G06K 9/00087* (2013.01); *G06K 9/22* (2013.01)

(58) Field of Classification Search
CPC .......... G06K 9/00006–9/0012; G06K 9/00221–2009/00328
See application file for complete search history.

(56) References Cited

U.S. PATENT DOCUMENTS

| 2012/0071149 | A1* | 3/2012 | Bandyopadhyay ... G06F 1/1643 455/418 |
| 2014/0019743 | A1* | 1/2014 | DeLuca ............... G06F 1/3206 713/100 |
| 2016/0226666 | A1* | 8/2016 | Quirk ..................... G06F 21/32 |
| 2017/0300682 | A1* | 10/2017 | Alten ..................... G06F 21/32 |
| 2018/0247313 | A1* | 8/2018 | Li ............................ G06K 9/00 |
| 2019/0034667 | A1* | 1/2019 | Zhou ..................... H04L 63/08 |

* cited by examiner

*Primary Examiner* — Brian Werner
(74) *Attorney, Agent, or Firm* — Ferguson Braswell Fraser Kubasta PC

(57) ABSTRACT

Systems and methods for keeping a display screen active that include a fingerprint sensor coupled to a processing system and configured to perform a check for a presence of a finger. The processing system may be configured to alert an operating system to cause a display screen to be in an active state based on a detection of the finger; perform a future finger sense action to detect that the finger is still interacting with the fingerprint sensor; report to an operating system, based on detecting that the finger is still interacting with the fingerprint sensor, that the display screen should remain in the active state, wherein the operating system causes the display screen to be in the active state based on the report.

16 Claims, 8 Drawing Sheets

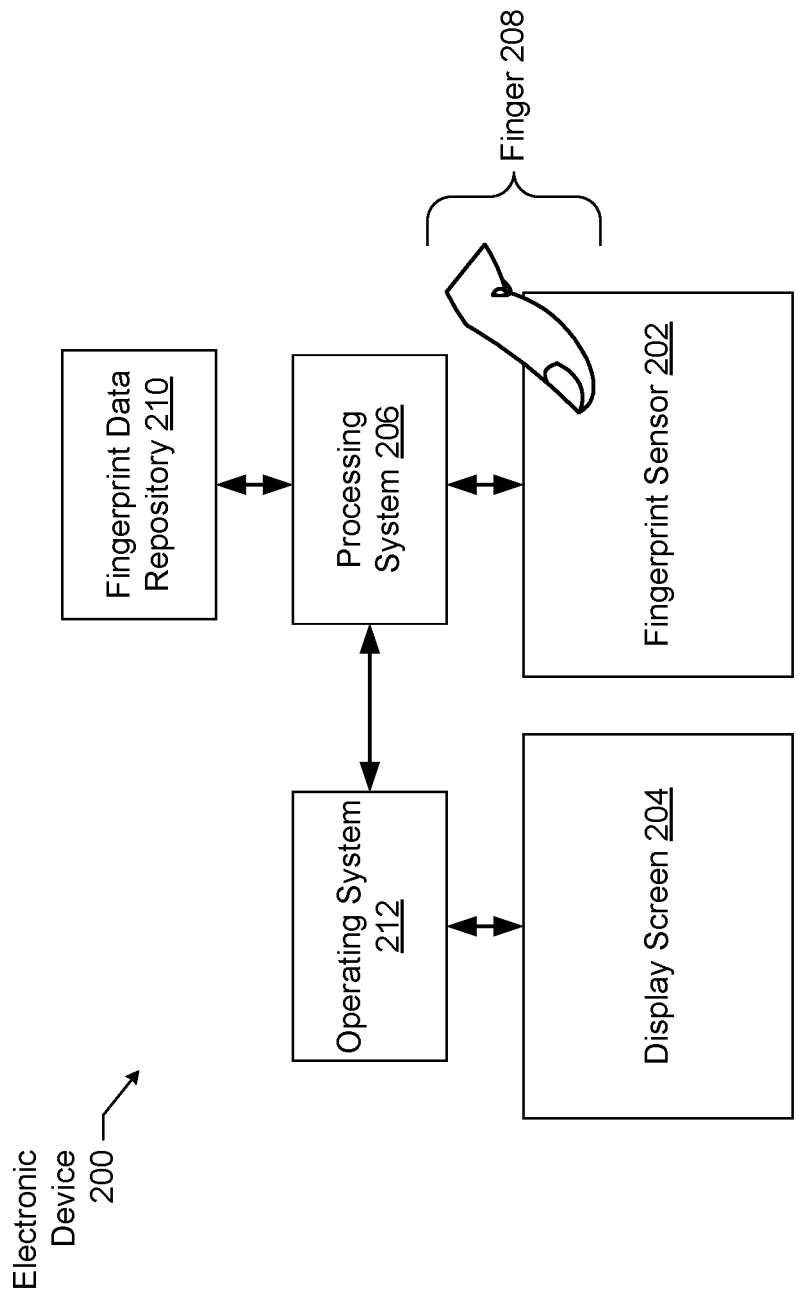
FIG. 2.1

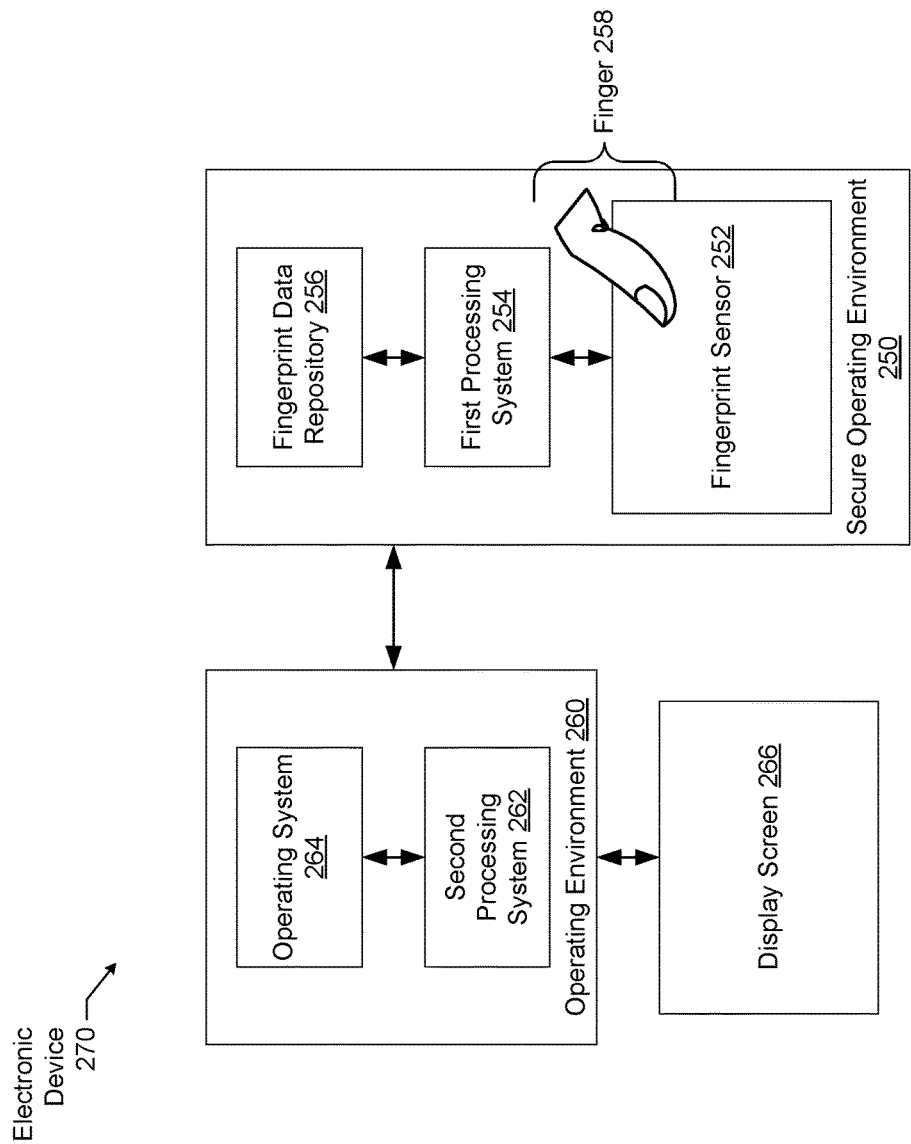
FIG. 2.2

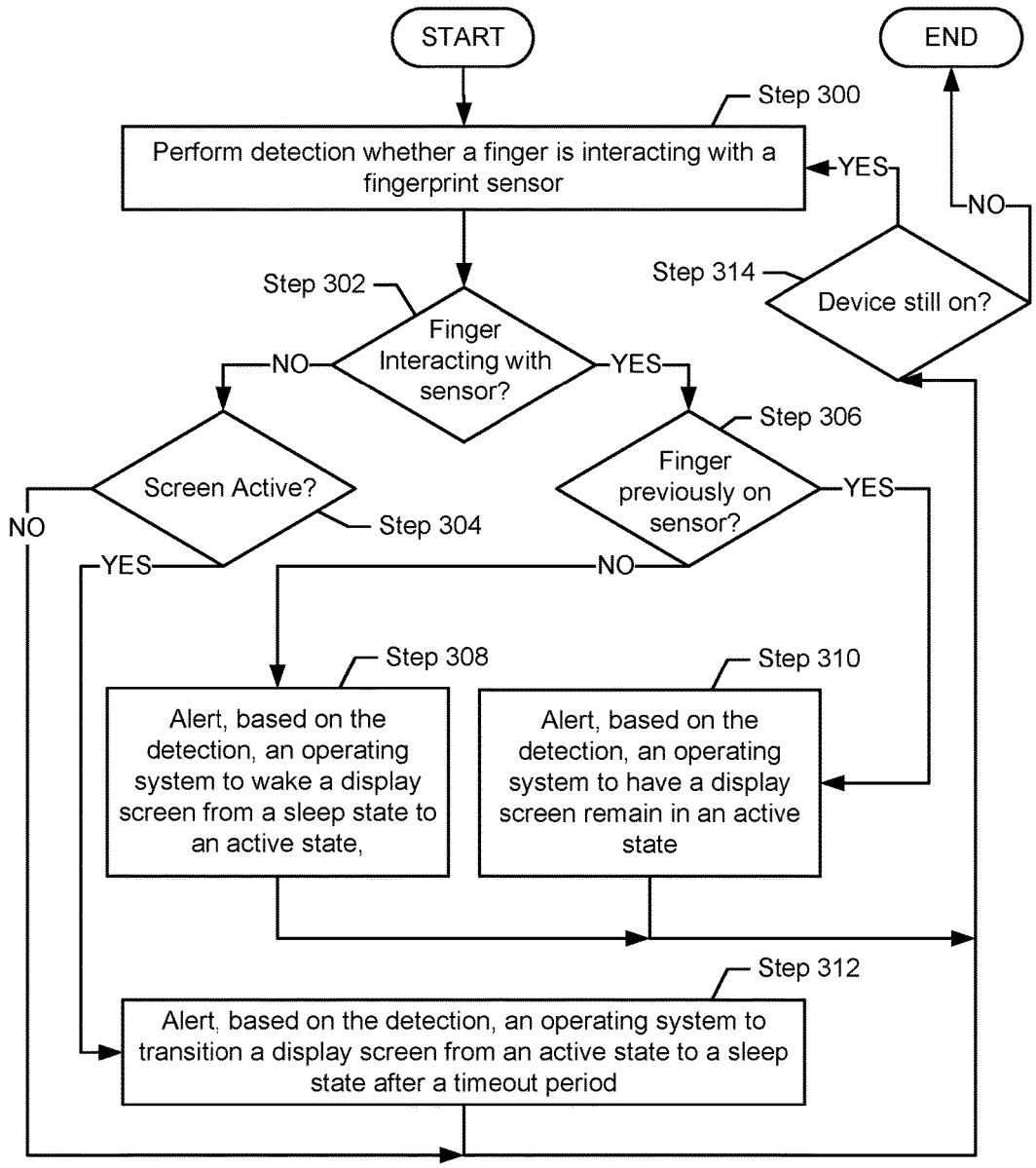
FIG. 3.1

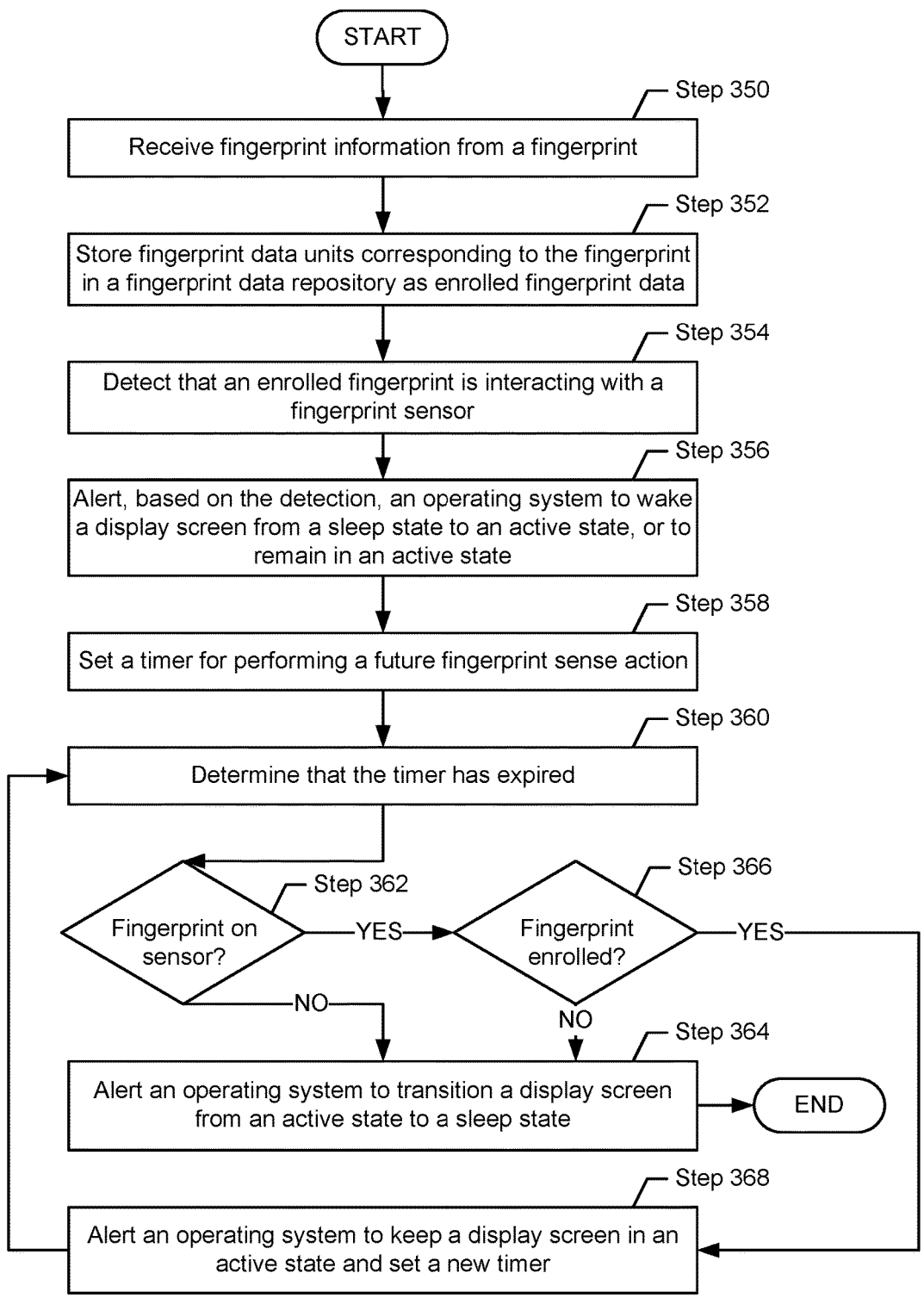
FIG. 3.2

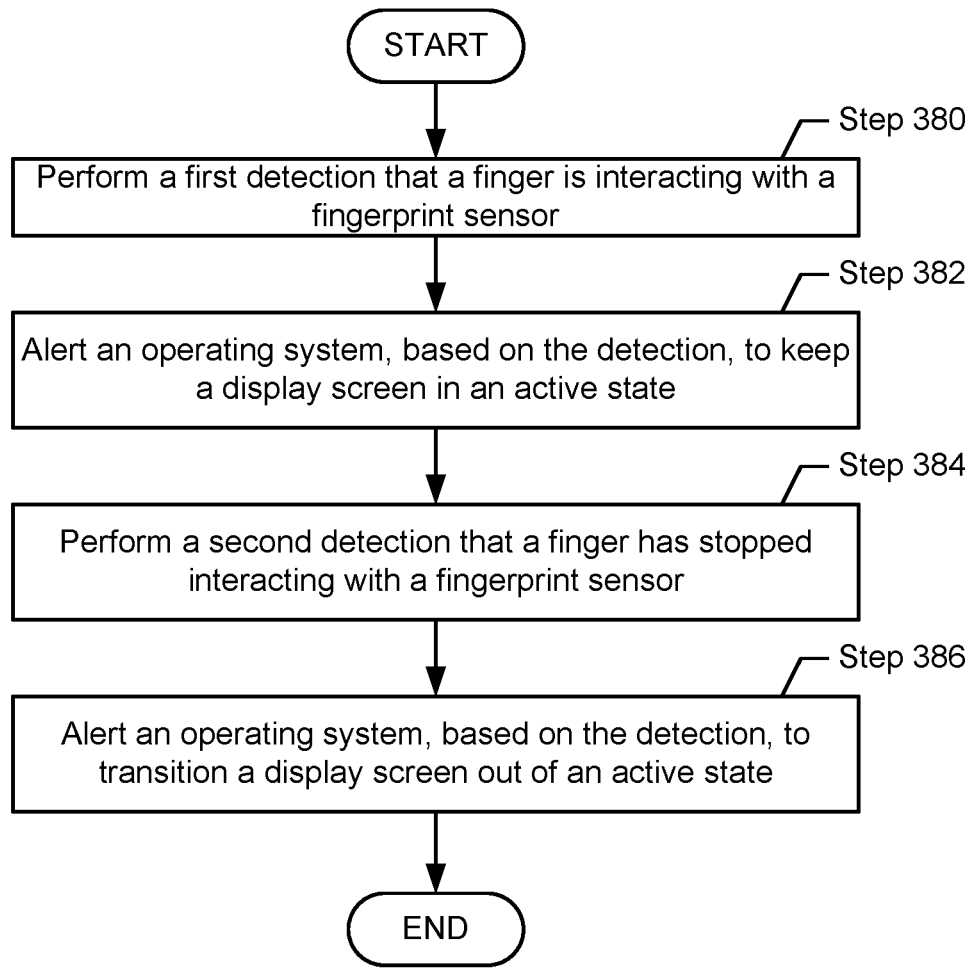
FIG. 3.3

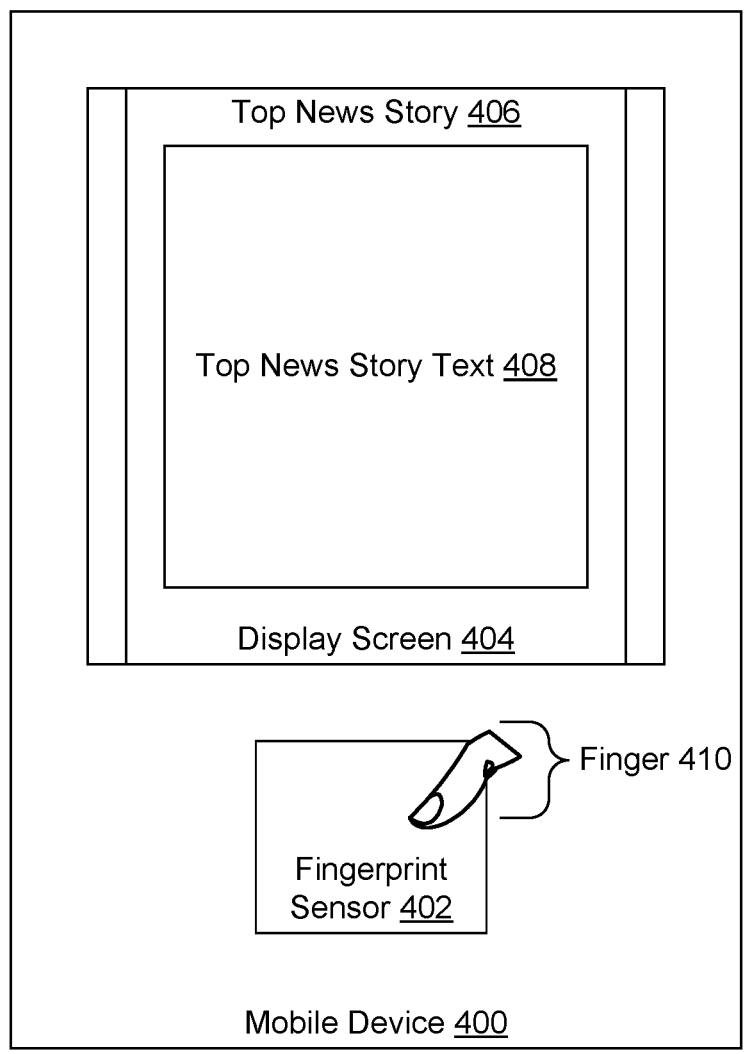
FIG. 4.1

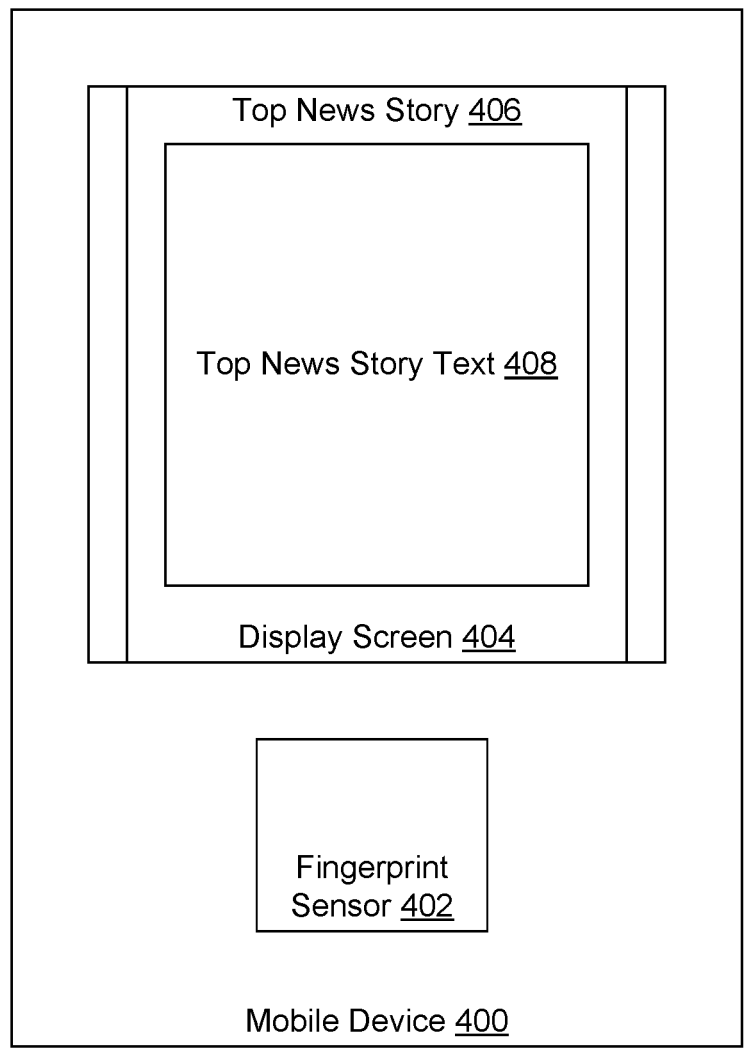
FIG. 4.2

USE FINGERPRINT SENSOR SIGNAL TO PREVENT DEVICE SLEEP

FIELD

The disclosed embodiments generally relate to electronic devices, and more particularly to systems and methods for detecting the presence of a finger in order to decide whether a display screen should remain active.

BACKGROUND

Electronic devices (e.g., smart phones) often have display screens. Such display screens may power off or transition to a lower power state due to detected inactivity by the user. Such action may cause a user of the electronic device to have to restart the device or perform an action to cause the screen to power on or back to an active state, which may be cumbersome to a user.

SUMMARY

In general, in one aspect, embodiments disclosed herein relate to a system that includes a fingerprint sensor coupled to a processing system and configured to periodically perform a check for a presence of a finger. The system also includes the processing system configured to alert an operating system to cause a display screen to be in an active state based on a detection of the finger; perform a future finger sense action to detect that the finger is still interacting with the fingerprint sensor; report to an operating system, based on detecting that the finger is still interacting with the fingerprint sensor, that the display screen should remain in the active state, wherein the operating system causes the display screen to be in the active state based on the report.

In general, in one aspect, embodiments disclosed herein relate to an electronic system that includes a display screen and a secure operating environment. The secure operating environment may include a fingerprint sensor coupled to a first processing system and configured to periodically perform a check for a presence of a finger. The first processing system may be configured to alert an operating system to cause a display screen to be in an active state based on a detection of the finger; perform a future finger sense action to detect that the finger is still interacting with the fingerprint sensor; and report to an operating system, based on detecting that the finger is still interacting with the fingerprint sensor, that the display screen should remain in the active state. The electronic system may also include an operating environment coupled to the secure operating environment and to the display screen that includes a second processing system and the operating system executing on the second processing system and configured to cause the display screen to be in the active state based on the report.

In general, in one aspect, embodiments disclosed herein relate to a method that includes performing a check to detect a presence of a finger on a fingerprint sensor; alerting an operating system to cause a display screen to be in an active state based on a detection of the finger; performing a future fingerprint sense action to detect that the finger is still interacting with the fingerprint sensor; and reporting to an operating system, based on detecting that the finger is still interacting with the fingerprint sensor, that the display screen should remain in the active state. The operating system may cause the display screen to be in the active state based on the report.

In general, in one aspect, embodiments disclosed herein relate to a system that includes a fingerprint sensor coupled to a processing system and configured detect a finger interacting with the fingerprint sensor. The processing system may be configured to receive, from the fingerprint sensor, a first detection that the finger is interacting with the fingerprint sensor; send a first alert to an operating system to cause a display screen remain in an active state based on the first detection; receive, after sending the first alert, a second detection from the fingerprint sensor that the finger is no longer interacting with the fingerprint sensor; and send a second alert to the operating system to revert to a configured mode of operation related to the display screen.

In general, in one aspect, embodiments disclosed herein relate to a system that includes a finger sensing means for detecting a finger interacting with an electronic device; a means for receiving a first detection that the finger is interacting with the electronic device; a means for sending a first alert to an operating system to cause a display screen remain in an active state based on the first detection; a means for receiving, after sending the first alert, a second detection that the finger is no longer interacting with the electronic device; and a means for sending a second alert to the operating system to revert to a configured mode of operation related to the display screen.

Other aspects disclosed herein will be apparent from the following description and the appended claims.

BRIEF DESCRIPTION OF DRAWINGS

FIG. 2.1 shows a block diagram of an example electronic device in accordance with an embodiment disclosed herein.

FIG. 2.2 shows a block diagram of an example electronic device in accordance with an embodiment disclosed herein.

FIG. 3.1 shows a flowchart in accordance an embodiment disclosed herein.

FIG. 3.2 shows a flowchart in accordance an embodiment disclosed herein.

FIG. 3.3 shows a flowchart in accordance an embodiment disclosed herein.

FIG. 4.1 shows an example in accordance with an embodiment disclosed herein.

FIG. 4.2 shows an example in accordance with an embodiment disclosed herein.

DETAILED DESCRIPTION

Figure 1:
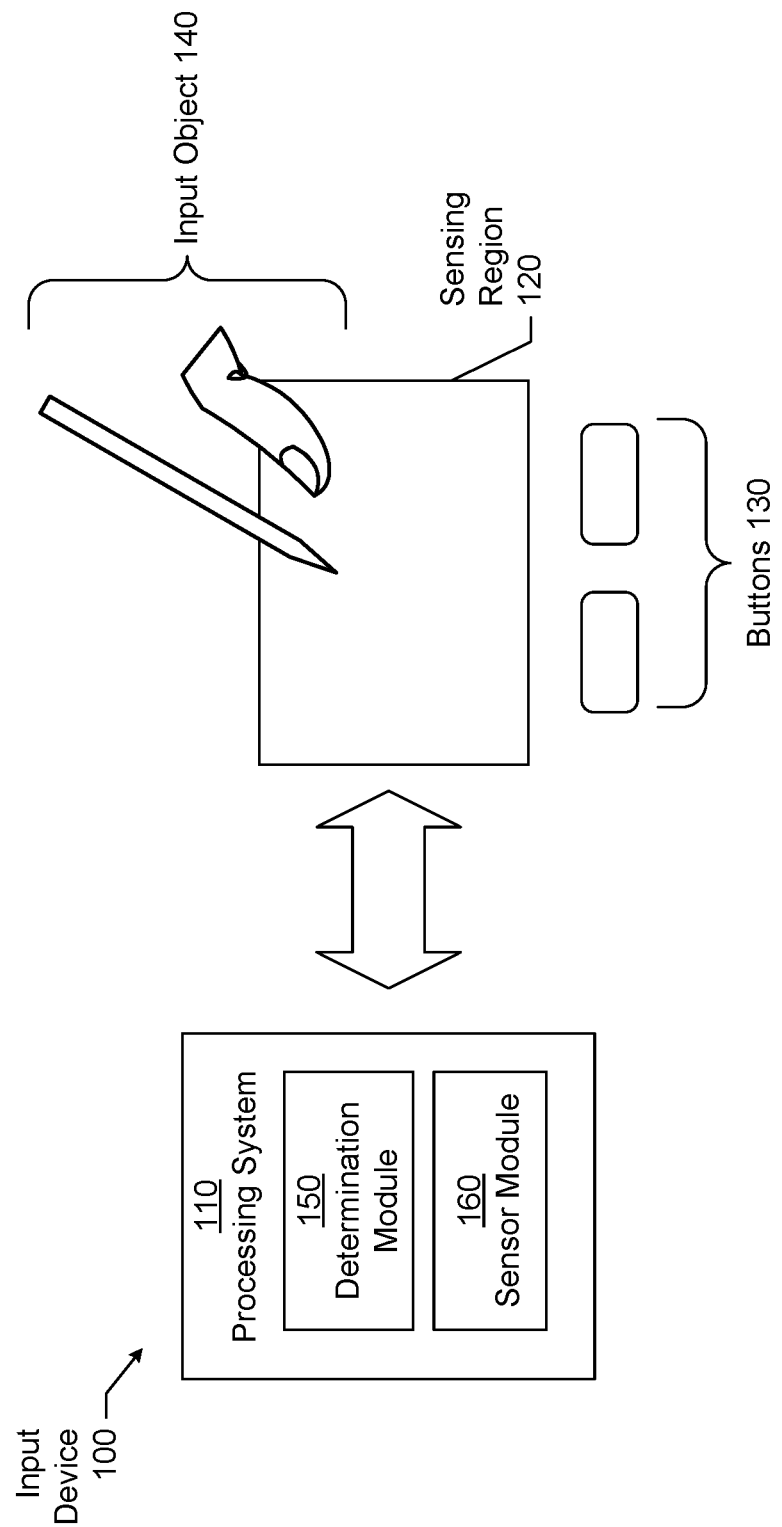
FIG. 1 shows a block diagram of an example system that includes an input device in accordance with an embodiment disclosed herein.

Specific embodiments disclosed herein will now be described in detail with reference to the accompanying figures. Like elements in the various figures may be denoted by like reference numerals and/or like names for consistency.

The following detailed description is merely exemplary in nature, and is not intended to limit the embodiments disclosed herein or the application and uses of embodiments disclosed herein. Furthermore, there is no intention to be bound by any expressed or implied theory presented in the preceding technical field, background, brief summary or the following detailed description.

In the following detailed description of some embodiments disclosed herein, numerous specific details are set forth in order to provide a more thorough understanding of the various embodiments disclosed herein. However, it will be apparent to one of ordinary skill in the art that the embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Some embodiments provide input devices and methods that facilitate improved usability. In particular, one or more embodiments disclosed herein provide a user of a device the ability to wake a display screen of a device or keep a display screen of the device in an active state while the user is using the device. More specifically, one or more embodiments disclosed herein include functionality to determine whether a finger is interacting with a fingerprint sensor of the device. If a finger is interacting with the fingerprint sensor, then embodiments disclosed herein will keep the display screen from transitioning from an active state to a sleep state for a period of time, or cause a display screen to transition to an active state. At the end of the period of time, embodiments disclosed herein again determine if a finger is interacting with the fingerprint sensor. Once a determination is made that no finger is interacting with the fingerprint sensor, embodiments disclosed herein may transition the display screen from an active state to a sleep state or other lower power state.

Turning now to the figures, FIG. 1 is a block diagram of an exemplary input device (100), in accordance with some embodiments disclosed herein. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls, mice, fingerprint sensors, etc.), and data output devices (including display screens and printers). Other examples include remote terminals, kiosks, and video game machines (e.g., video game consoles, portable gaming devices, and the like), augmented reality devices, virtual reality devices, wearable devices (e.g., smart watches, smart glasses, etc.), and vehicular devices (e.g., electronic systems within and/or operatively connected to a vehicle). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of a module (e.g., the determination module (150)) may be implemented in the device driver of the electronic system. As appropriate, the input device (100) may communicate with parts of the electronic system using any one or more of the following: buses, networks, and other wired or wireless interconnections. Examples include inter-integrated circuit ($I^2C$), serial peripheral interface (SPI), personal system/2 (PS/2), Universal Serial Bus (USB), Bluetooth, radio frequency (RF) connector, and infrared data association (IrDA) connector.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. For example, all or a portion of any sensing region of an input device may include functionality to sense a fingerprint of finger input object.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in some embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In some embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, thermal, acoustic, ultrasonic, force, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some optical implementations of the input device (100), one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, complementary metal oxide semiconductor (CMOS) image sensor arrays, charge coupled device (CCD) arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object. In some embodiments, a display and/or one or more discrete light sources (e.g., dedicated LEDs) are used as an active illumination source for optical sensing.

One example optical technique utilizes direct illumination of the input object, which may or may not be in contact with an input surface of the sensing region depending on the configuration. One or more light sources and/or light guiding structures are used to direct light to the sensing region. When an input object is present, such light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across the boundary defined by the interface, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across the interface at the region of contact by the input object. An example of such a region of contact is a presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. Such an optical response can be detected by the system and used to determine spatial information. In some embodiments, spatial information may be used to image small scale surface variations of the input object, such as fingerprint patterns, where the internal reflectivity of the incident light differs depending on whether a ridge or valley of the finger is in contact with that portion of the input surface.

In some acoustic implementations of the input device (100), one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One exemplary acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or individual elements that both transmit and receive may be used (e.g., ultrasonic transceivers). In one implementation, an acoustic pulse is emitted and reflected at the interface corresponding to the input surface. The acoustic impedance at the interface differs depending on whether a ridge or valley of a finger is in contact with that portion of the input surface, affecting the intensity of the detected waves reflected back from the input surface. In some embodiments, emitted ultrasonic waves are able to penetrate sub-surfaces of the input object, such as dermal layers of a human finger.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In some embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage. In some embodiments the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In some embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and, in some embodiments, the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes. In one or more embodiments disclosed herein, the electrodes are arranged in an array to form a fingerprint sensor. In such embodiments, the array may include any number of electrodes arranged in any pattern. As a non-limiting example, electrodes for fingerprint sensing may be arranged in a grid that is four electrodes by four electrodes, six electrodes by six electrodes, etc.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, a computer program product, and/or the like.

In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, receiving and processing measurements related to the input device (e.g., resistances, voltages, currents, etc.), enrolling and verifying fingerprints, etc.

The processing system (110) may be implemented as a set of modules that handle different functions of the processing system (110). Each module may include circuitry that is a part of the processing system (110), firmware, software, and/or a combination thereof. In some embodiments, modules may be standalone modules, or may be implemented as various combinations of modules. Any one or more modules may be linked to any one or more other modules, with such links allowing the modules to function together to form a system. As a non-limiting example, a module or set of modules (e.g., processing system (110)), as used herein, may include software written in any programming language, which may be stored on volatile and/or non-volatile memory. Such software, when executed, may lead, directly (e.g., via compilation) or indirectly (e.g., via interpretation), to the generation of machine code (e.g., binary numbers such as 11010101) used as input to at least a portion of the integrated circuitry of one or more processors. Input of machine code to the processor(s) may cause various effects within the circuitry of the processor(s), with such effects implementing at least a portion of the programming language source code from which the machine code was derived. Examples of such effects include, but are not limited to: biasing a transistor to allow current flow or not; creating connections between various portions of the circuitry; causing current to flow through various portions of circuitry; causing the voltage across a circuit element to change; etc. Said another way, as used herein, a module configured to perform certain functionality should be understood to include software and/or firmware, as well as at least a portion of the underlying computing hardware on which the software executes.

For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, determine if a fingerprint is an enrolled fingerprint, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments disclosed herein. Such alternative or additional modules may correspond to distinct modules, or to sub-modules of one or more of the modules discussed above. Example alternative or additional modules include hardware operation modules for operating hardware such as: sensor electrodes; haptic actuator components; fingerprint sensors; display screens; data processing modules for processing data such as sensor signals and positional information; reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include locking or unlocking access to a device, transitioning a display screen to an active or inactive state, maintaining an active state of a display screen, changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes or other modules. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, recognize enrolled fingerprints, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a sensing region (120) that overlaps at least part of an active area of a display screen. As used herein, the term overlaps or overlapping refer to at least a partial alignment of two or more components, which may occur in any order. As such, when a first component and a second component are overlapping, either component may be closer to the surface of a touch screen interface or other portion of an electronic device. For example, the input device (100) may include substantially transparent sensor electrodes overlaying the display screen and providing a touch screen interface for the associated electronic system. It should be understood that while many embodiments disclosed herein are described in the context of a fully-functioning apparatus, the mechanisms of the present embodiments are capable of being distributed as a program product (e.g., software) in a variety of forms. For example, the mechanisms of the present embodiments may be implemented and distributed as a software program on information-bearing media that are readable by electronic processors (e.g., non-transitory computer-readable and/or recordable/writable information bearing media that is readable by the processing system (110)).

Additionally, the embodiments disclosed herein apply equally regardless of the particular type of medium used to carry out the distribution. For example, software instructions in the form of computer readable program code to perform embodiments disclosed herein may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments disclosed herein may be implemented on a distributed system having several nodes, where each portion one or more embodiments may be located on a different node within the distributed system. In one embodiment disclosed herein, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of embodiments disclosed herein. For example, various components may be combined to create a single component. As another example, the functionality performed by a single component may be performed by two or more components. Accordingly, embodiments should not be limited to the configuration of components shown in FIG. 1.

FIG. 2.1 shows an electronic device (200) in accordance with one or more embodiments disclosed herein. As shown in FIG. 2.1, the electronic device (200) includes a fingerprint sensor (202), a display screen (204), a processing system (206), a fingerprint data repository (210), and an operating system (212). Each of these components is described below.

In one or more embodiments disclosed herein, the fingerprint sensor (202) is any sensor capable of detecting the presence of a fingerprint in a fingerprint sensing region (not shown). As used herein, fingerprint means a pattern formed by ridges on the surface of the skin of a finger or thumb. In one or more embodiments disclosed herein, the fingerprint sensor (202) may be any combination of hardware (e.g., circuitry), software, firmware, or a combination thereof.

A fingerprint sensor (202) may detect the presence of a fingerprint using any method. Examples of such a method include, but are not limited to, optical fingerprint sensing, capacitive fingerprint sensing, and ultrasonic fingerprint sensing. An optical fingerprint sensor may capture an image of a fingerprint using light. A capacitive fingerprint sensor may include any number of electrodes and may use either mutual or absolute capacitance (described above) to form a capacitive image of a fingerprint. An ultrasonic fingerprint sensor may use high-frequency waves to create an ultrasonic image of a layer underneath the surface skin of a finger that includes the same or similar pattern as the fingerprint. In one or more embodiments disclosed herein, one or more of the aforementioned types of fingerprint sensors may be implemented together in a single fingerprint sensor and/or implemented separately on different fingerprint sensors of the same electronic device. In one or more embodiments disclosed herein, the fingerprint sensor (202) also includes a force or pressure sensor.

A fingerprint sensor (202) may detect a fingerprint that a user places over the sensor, and/or may detect a fingerprint that is swiped over the sensor. The finger for which a fingerprint is being detected may or may not come into actual contact with the fingerprint sensor (i.e., the fingerprint may be proximate to the sensor without actually touching the sensor). In one or more embodiments disclosed herein, a fingerprint sensor (202) is located anywhere on the exterior of a device. As an example of such an embodiment, the fingerprint sensor (202) may be an array of electrodes of any size and/or quantity that is located on a portion of a smart phone (i.e., an electronic device (200)), such as a display screen, a home button, the rear of the smartphone, and/or the sides of the smart phone.

In one or more embodiments disclosed herein, the fingerprint sensor (202) is operatively connected to a processing system (206). In one or more embodiments disclosed herein, the processing system (206) is substantially similar to the processing system (110) discussed above in the description of FIG. 1. As such, in one or more embodiments disclosed herein, the processing system (206) includes parts of, or all of, one or more integrated circuits (ICs) and/or other circuitry components and the capability to use said circuitry for the execution of software and/or firmware to perform at least a portion of the functionality described herein. In one or more embodiments disclosed herein, the processing system (206) includes functionality to receive information from the fingerprint sensor (202) and process the information to determine whether or not a finger (e.g., finger 208), and corresponding fingerprint, is interacting (e.g., in contact with or proximate to) the fingerprint sensor. In one or more embodiments disclosed herein, if a finger (208) is determined to be interacting with the fingerprint sensor, the processing system (206) includes functionality to process data corresponding to the fingerprint of the finger to store fingerprint data in a fingerprint data repository and/or detect that the fingerprint is an enrolled fingerprint based on a comparison with fingerprint data already in a fingerprint data repository (210).

In one or more embodiments disclosed herein, the processing system (206) is operatively connected to the aforementioned fingerprint data repository (210). In one or more embodiments disclosed herein, the fingerprint data repository (210) is any type of storage unit and/or device (e.g., a file system, database, collection of tables, or any other storage mechanism) for storing data. Further, the fingerprint data repository (210) may include multiple different storage units and/or devices. The multiple different storage units and/or devices may or may not be of the same type or located at the same physical site.

In one or more embodiments disclosed herein, the fingerprint data repository (210) includes functionality to store fingerprint data corresponding to any number of individual fingerprints from any number of users of an electronic device (200) with a fingerprint sensor (202). In one or more embodiments disclosed herein, the fingerprint data stored in the fingerprint data repository (210) corresponds to any number of fingerprints enrolled via an enrollment process. In one or more embodiments disclosed herein, an enrollment process is any process by which a user of an electronic device (200) including or otherwise coupled to a fingerprint sensor (202) provides fingerprint data, via the fingerprint sensor, to the electronic device to be stored for use in future fingerprint verification. Fingerprint verification may be performed for any reason. Examples of such reasons include, but are not limited to, unlocking an electronic device, causing a display screen of an electronic device to transition from a sleep state (e.g., the screen is off) to an active state (e.g., the screen is on), causing an electronic device to transition from a low power mode to a higher power mode, etc.

In one or more embodiments disclosed herein, the processing system (206) is also operatively connected to an operating system (212) (e.g., the operating system executes using the processing system). In one or more embodiments disclosed herein, an operating system (212) includes any software and/or firmware for managing the resources (e.g., hardware, other software, etc.) of one or more electronic devices (200). More specifically, the operating system (212) may be a program or set of programs that manages all or a portion of the other software (e.g., applications) in an electronic device (200).

Management by an operating system (212) may include scheduling, hardware allocation, application execution, network access, management of access to stored files that are selectively made available to applications running on the operating system, etc. An operating system (212) may also manage and enforce settings and permissions customized for specific applications running on the operating system (212). In one or more embodiments disclosed herein, the operating system (212) includes functionality to control the state of a display screen (204). For example, the operating system (212) may include, but is not limited to, functionality to turn on or off a display screen (204), increase or reduce power output to a display screen, adjust parameters (e.g., brightness) of a display screen, transition a display screen from an active state to an intermediate and/or sleep state, transition a display screen from a sleep and/or intermediate state to an active state, etc.

In one or more embodiments disclosed herein, the operating system (212) is operatively connected to a display screen (204). The display screen (204) may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device of FIG. 1 (i.e., input device (100)) and the display screen (204) may share physical elements. For example, some embodiments may utilize some of the same electrical components for displaying and sensing. In some embodiments, one or more display electrodes of a display device may be configured for both display updating and input sensing. As another example, the display screen may be operated in part or in total by the processing system (206) via the operating system (212).

While FIG. 2.1 shows a configuration of components, other configurations may be used without departing from the scope of embodiments disclosed herein. For example, various components may be combined to create a single component. As another example, the functionality performed by a single component may be performed by two or more components. Accordingly, embodiments disclosed herein should not be limited to the configuration of components shown in FIG. 2.1.

FIG. 2.2 shows an electronic device (270) in accordance with one or more embodiments disclosed herein. As shown in FIG. 2.2, the electronic device (270) includes a secure operating environment (250) that includes a fingerprint sensor (252), a first processing system (254) and a fingerprint data repository (256). The electronic device (270) of FIG. 2.2 also includes a display screen (266) and an operating environment (260) that includes an operating system (264) and a second processing system (262). Each of these components is described below.

In one or more embodiments disclosed herein, a secure operating environment (250) is a secure area/portion of an electronic device (270) which ensures that sensitive data is stored, processed, and/or protected in a secure environment. In one or more embodiments disclosed herein, a secure operating environment (250) is an isolated execution environment with its own set of hardware and software components that runs in parallel with but separate from an operating environment (260), and includes functionality to provide secure services for the operating environment, such as fingerprint enrollment and/or verification. For example, a secure operating environment (250) may include secure operating environment software (not shown) and appropriate device hardware, such as at least a portion of one or more device processing systems (e.g., first processing system (254)). As another example, secure operating environment (250) software may be installed by a device manufacturer such that the secure operating environment software automatically executes using secure operating environment hardware of the device (e.g., first processing system (254), fingerprint data repository (256)) for certain applications which require use of sensitive data (e.g., fingerprint enrollment and/or verification). In one or more embodiments disclosed herein, the secure operating environment (250) and/or secure applications executing therein are configured to manage sensitive information (e.g., fingerprint data) on behalf of a user of an electronic device (270).

In one or more embodiments disclosed herein, the secure operating environment (250) includes a fingerprint sensor (252). In one or more embodiments disclosed herein, the fingerprint sensor (252) is substantially similar to the fingerprint sensor (202) of FIG. 2.1, except that it interacts only with software and/or hardware that is also included in the secure operating environment (e.g., first processing system (254)). In one or more embodiments disclosed herein, including the fingerprint sensor (252) in the secure operating environment reduces the risk that the fingerprint data can be compromised via other portions (e.g., software, hardware, etc.) of the device, such as using the operating system (264) that is executing in the operating environment (260) rather than the secure operating environment (250).

In one or more embodiments disclosed herein, the fingerprint sensor (252) is operatively connected to the first processing system (254). In one or more embodiments disclosed herein, the first processing system (254) includes parts of, or all of, one or more integrated circuits (ICs) and/or other circuitry components and the capability to use said circuitry for the execution of software and/or firmware to perform at least a portion of the functionality described herein. Specifically, in one or more embodiments disclosed herein, the first processing system (254) includes functionality to receive information from the fingerprint sensor (252) and process the information to determine whether or not a finger (e.g., finger 258), and corresponding fingerprint, is interacting (e.g., in contact with or proximate to) the fingerprint sensor.

In one or more embodiments disclosed herein, if a finger (208) is determined to be interacting with the fingerprint sensor (252), the first processing system (254) includes functionality to process data corresponding to the fingerprint to store fingerprint data in a fingerprint data repository (256) and/or detect that the fingerprint is an enrolled fingerprint based on a comparison with fingerprint data already in a fingerprint data repository (256). In one or more embodiments disclosed herein, use of the first processing system (254) in the secure operating environment (250) separate from other processing systems of a device helps ensure that data related to fingerprints remains entirely within the secure operating environment.

In one or more embodiments disclosed herein, the first processing system (254) includes functionality to communicate with other portions of a device (e.g., operating system (264) executing using the second processing system (262) of the operating environment (260)) to convey information regarding whether or not a given action should or should not occur based on the results of a fingerprint verification (or lack thereof). In one or more embodiments disclosed herein, communication by the first processing system (254) with any portion of a device outside the secure operating environment never includes any actual fingerprint data that could be used to compromise the electronic device (270).

In one or more embodiments disclosed herein, the first processing system (254) is coupled to a fingerprint data repository (256). In one or more embodiments disclosed herein, the fingerprint data repository (256) is substantially similar to the fingerprint data repository (210) of FIG. 1, except that it resides wholly within the secure operating environment (250).

In one or more embodiments disclosed herein, the secure operating environment (250) is coupled in a secure manner to an operating environment (260) in which an operating system (264) executes using a second processing system (262). In one or more embodiments disclosed herein, the secure operating environment (250) and the operating environment (260) are separated by logical and/or physical barriers. For example, a mobile electronic device (e.g., smart phone) may include secure operating environment (250) software that executes using a first processing system (254), a storage device (e.g., the fingerprint data repository), and first stored instructions of the mobile electronic device, and also include an operating environment (260) executing using a second processing system (262), second storage device (not shown), and second stored instructions (e.g., operating system (264)) of the mobile electronic device, thereby actuating a physical separation of the secure operating environment (250) and the operating environment (260).

In one or more embodiments disclosed herein, the operating environment includes an operating system (264) that is substantially similar to operating system (212) discussed above in the description of FIG. 2.1, except that it executes in the operating environment (260), which is physically and/or logically isolated from the secure operating environment (250).

In one or more embodiments disclosed herein, the operating environment includes a second processing system (262) that is substantially similar to processing system (206) discussed above in the description of FIG. 2.1, except that it exists in the operating environment (260), which is physically and/or logically isolated from the secure operating environment (250).

In one or more embodiments disclosed herein, the display screen (266) is substantially similar to display screen (204) discussed above in the description of FIG. 2.1.

While FIG. 2.2 shows a configuration of components, other configurations may be used without departing from the scope of embodiments disclosed herein. For example, various components may be combined to create a single component. As another example, the functionality performed by a single component may be performed by two or more components.

FIG. 3.1, FIG. 3.2, and FIG. 3.3 each show a flowchart in accordance with one or more embodiments disclosed herein. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments disclosed herein. By way of an example, determination steps may not require a processor to process an instruction unless an interrupt is received to signify that condition exists in accordance with one or more embodiments disclosed herein. As another example, determination steps may be performed by performing a test, such as checking a data value to test whether the value is consistent with the tested condition in accordance with one or more embodiments disclosed herein.

FIG. 3.1 shows a flowchart describing a method for determining when or if a display screen of an electronic device should transition between an active state and a sleep state or other lower power state.

In Step 300, a fingerprint sensor of an electronic device performs a detection as to whether a finger is interacting with the fingerprint sensor. A detection may occur periodically, aperiodically, or in response to any interrupt, indication, input, etc. from any source. In one or more embodiments, the fingerprint sensor is configured to periodically perform a detection to determine if a finger is interacting with the fingerprint sensor. The periodic scanning may occur at a relatively low duty cycle and/or may detect a finger using an image resolution that is lower than an image resolution that would be used, for example, for fingerprint verification, which may require a higher resolution image.

In Step 302, a determination is made as to whether a finger is interacting with the sensor. If a finger is detected the process proceeds to Step 306. If a finger is not detected, the process proceeds to Step 304.

In Step 304, after a determination is made that there is no finger interacting with the fingerprint sensor, a further determination is made as to whether the display screen is currently active. In one or more embodiments, the determination of whether the display screen is active includes querying the operating system, checking the electrical state of the screen, or any other method of determining that a display screen is active. If it is determined that the display screen is not currently active, the process continues to Step 314. If, on the other hand, a determination is made that the screen is active, the process proceeds to Step 312.

In Step 312, based on no detection of a finger in Step 302, and a determination that the display screen is active in Step 304, an operating system is alerted cause a display screen of an electronic device to transition from the active state to a sleep state or other lower power state. In one or more embodiments, the operating system is alerted via an indication, interrupt, message, and/or other signal provided via a processing system coupled to the fingerprint sensor. In one or more embodiments, once alerted, the operating system performs one or more actions required to transition. In one or more embodiments disclosed herein, transition to the sleep state may include one or more intermediate states of progressively lower power consumption. In one or more embodiments disclosed herein, alerting an operating system causes the operating system to, instead of beginning a screen state transition, to revert to configured device behavior regarding the power state of the display screen. In one or more embodiments disclosed herein, after performing Step 312, the process proceeds to Step 314.

Returning to Step 306, if a finger is detected in Step 304, a determination is made as to whether the finger was detected during the previous detection. If not, the process proceeds to Step 308. If a finger was previously detected, the process proceeds to Step 310.

In Step 308, based on the detection of a finger in Step 304 and a determination that the finger was not detected in the last periodic detection in Step 306, an operating system is alerted to cause a display screen of an electronic device to transition from a sleep state to an active state. In one or more embodiments, the operating system is alerted via an indication, interrupt, message, and/or other signal provided via a processing system coupled to the fingerprint sensor. In one or more embodiments, once alerted, the operating system performs one or more actions required to transition a display screen to an active state. In one or more embodiments disclosed herein, after performing Step 308, the process proceeds to Step 314.

In Step 310, an operating system, based on the detection of a finger in Step 304 and a determination that the finger was detected in the last detection in Step 306, is alerted to cause a display screen to remain in the active state. In one or more embodiments, the operating system is alerted via an indication, interrupt, message, and/or other signal provided via a processing system coupled to the fingerprint sensor. In one or more embodiments, once alerted, the operating system performs one or more actions required to keep a display screen in an active state. In one or more embodiments disclosed herein, after performing Step 310, the process proceeds to Step 314.

In Step 314, a determination is made as to whether the device having the display screen is still powered on. It may have been powered off for any reason, such as, for example, a user powering the device off, the device running out of battery, a planned system restart, etc. If the device is still powered on, the process returns to Step 300. If the device is no longer on, the process ends.

FIG. 3.2 shows a flowchart describing a method for determining when or if a display screen of an electronic device should transition between an active state and a sleep state or lower power state based on the presence or not of an enrolled fingerprint.

In Step 350, fingerprint information is received from one or more fingerprints. In one or more embodiments disclosed herein, the fingerprint information is received as part of a fingerprint enrollment process. For example, a user of an electronic device may elect to set up fingerprint verification for performing certain actions on the electronic device, which is accomplished by enrolling one or more fingerprints with the electronic device that can be verified later when a user seeks to perform such an action. Such an enrollment process may require the user to place a finger on or proximate to a fingerprint sensor of an electronic device. The fingerprint sensor may use any method (e.g., capacitive) to detect the fingerprint that is interacting with the fingerprint sensor and receive corresponding fingerprint information.

In Step 352, the fingerprint information received in Step 350 is stored in a fingerprint data repository. The fingerprint information may be stored as one or more fingerprint data units, each of which corresponds to at least a portion of the fingerprint information. In one or more embodiments disclosed herein, the fingerprint data unit(s) may be stored for later comparison with new fingerprint information received by a fingerprint sensor of an electronic device.

In Step 354, a detection is made that a previously enrolled fingerprint is interacting with a fingerprint sensor of an electronic device. In one or more embodiments disclosed herein, the detection occurs by comparing at least a portion of the fingerprint information being received by the fingerprint sensor with one or more fingerprint data units retrieved from a fingerprint data repository. In one or more embodiments disclosed herein, a determination that the newly received fingerprint information matches one or more fingerprint data units provides verification that the newly received fingerprint information corresponds to a previously enrolled fingerprint (e.g., enrolled in Steps 350 and 352).

In Step 356, an operating system, based on the detection of an enrolled fingerprint, is alerted to either cause a display screen of an electronic device to transition from a sleep state (or other lower power state) to an active state, or, if the display screen is already in an active state, to remain in the active state. In one or more embodiments disclosed herein, the operating system is alerted via an indication, interrupt, message, and/or other signal provided via a processing system coupled to the fingerprint sensor. In one or more embodiments disclosed herein, once alerted, the operating system performs one or more actions required to transition to or keep a display screen in an active state.

Additionally, although not shown in FIG. 3.2, in some embodiments, finger presence detection on the fingerprint sensor is used to transition from a sleep state to an active state, or, if the display screen is already in an active state, to remain in the active state, without regard to whether the fingerprint matches an enrolled fingerprint, or portion thereof. For example, the fingerprint sensor can be operated in a lower resolution and/or lower power operating mode without a need to capture a high resolution fingerprint image or compare the fingerprint image to any portion of an enrolled fingerprint. In such an example, the fingerprint sensor may be sub-sampled and/or scanned at lower resolution, and the operating system alerted when a finger presence is detected.

Additionally or alternatively, dedicated presence detection elements in the fingerprint sensor may be used to take measurements that are compared to a touch threshold, and, when the touch threshold is crossed, the system determines that a finger or other object is present on or near the fingerprint sensor. In one or more embodiments disclosed herein, the detection need not be of a finger, but may instead be any portion of any detectable body part or other object, the detection of which satisfies a requirement or threshold of any sort. In such embodiments, the operating system is alerted to take the necessary action regarding the display screen based on detection of the satisfied requirement or threshold.

In Step 358, in some embodiments disclosed herein, a timer is set for performing a future fingerprint sense action. In one or more embodiments disclosed herein, the timer is implemented in hardware and/or software. The timer may count in any increment (e.g., seconds, minutes, etc.) and may be set for any amount of time. The timer may be pre-configured for a certain length of time, and/or may be configurable by a user. The timer may be a periodic or aperiodic timer. In other embodiments disclosed herein, the fingerprint sensor may be scanned continuously to detect whether a finger (or portion thereof), or any other object that the fingerprint sensor may be configured to detect. In such embodiments a timer may be unnecessary.

In Step 360, a determination is made that the timer set in Step 358 has expired (or that a new detection is needed, that a configured time period has expired, etc.). Such a determination may be made by any scheme for detecting the expiration of a timer or other time period ending. Examples of such a scheme for timer expiration detection include, but are not limited to, continuous timer monitoring, receipt of timer expiration notifications, etc. In one or more embodiments disclosed herein, such as embodiments in which the fingerprint sensor is scanned continuously, Step 310 is optional, as there is no set timer to expire.

In Step 362, in embodiments in which fingerprints must be enrolled and a timer is used, once the timer has expired, a determination is made as to whether an enrolled fingerprint is currently interacting with the fingerprint sensor of the electronic device.

In other embodiments, continuous fingerprint capture is used, and the fingerprint is continuously or periodically compared to enrolled fingerprint information to provide some persistent biometric authentication while also using the fingerprint signal to maintain the device in an active/higher power state. Optionally, this can be performed using less stringent requirements (such as lower matching thresholds) than what is normally used to unlock the device, which may increase usability.

In embodiments disclosed herein in which the fingerprint sensor is used to determine if a finger or some other object is interacting with the fingerprint sensor via comparison with a touch threshold, the fingerprint sensor may then be continuously or periodically scanned thereafter to take measurements that are compared to a lift threshold, and when the lift threshold is crossed, the system determines that the finger or other object has lifted off the fingerprint sensor.

In one or more embodiments disclosed herein, if a fingerprint, finger portion, or other object is interacting with the fingerprint sensor, the process proceeds to Step 366. If no such object is interacting with the fingerprint sensor, the process proceeds to Step 364.

In Step 364, based on the lack of detection of a fingerprint or other object interacting with the fingerprint sensor, an alert is provided to the operating system to transition from an active state to a sleep state. Such a transition may include any number of intermediate states in which the state of the screen is less than fully active (e.g., dimmed), but not yet fully in a sleep state.

In embodiments disclosed herein in which a touch and lift threshold are used, when the system determines that the finger has touched or is touching the fingerprint sensor, the system maintains the display in a higher power state (e.g., an active state) than when the display is off or in some other lower power state (e.g., a sleep state) until a finger lift event is detected. When the system determines that the finger has lifted off of the fingerprint sensor, the system may place the display in a lower power state (or in iteratively lower power states) after detecting the finger lift event (e.g., immediately, or after some default time of inactivity is detected after the finger lift event). Then the process ends.

In Step 366, after a fingerprint or other object has been determined to be interacting with the fingerprint sensor, a further determination is made as to whether the fingerprint is an enrolled fingerprint. Such a determination is made by comparing at least a portion of the fingerprint information corresponding to the finger and received via the fingerprint sensor with one or more fingerprint data units previously stored (e.g., in Step 352). If the comparison yields a match (i.e., the fingerprint is an enrolled fingerprint), the process proceeds to Step 368. If, on the other hand, the fingerprint is determined not to be an enrolled fingerprint (i.e., the comparison failed to yield a match), then the process proceeds to Step 364 (described above). One having ordinary skill in the art and the benefit of this Detailed Description will understand that in embodiments disclosed herein that do not require fingerprint enrollment, Step 366 may be optional.

In Step 368, an alert is provided to the operating system to keep the display screen in an active state and a new timer is set for performing a future fingerprint sense action, unless continuous fingerprint sensing is used, in which case no timer is required. In embodiments disclosed herein using a timer, the process then returns to Step 360, to determine when the new timer has expired. In other embodiments disclosed herein where continuous (e.g., periodic) sensing is used, although not shown in FIG. 3, the process returns to Step 362.

FIG. 3.3 shows a flowchart describing a method for determining when or if a display screen of an electronic device should transition between an active state and a sleep state.

In Step 380, a fingerprint sensor of an electronic device performs a first detection as to whether a finger is interacting in any way with the fingerprint sensor. The detection may occur at a relatively low duty cycle and/or may detect a finger using an image resolution that is lower than an image resolution that would be used, for example, for fingerprint verification, which may require a higher resolution image.

In Step 382, an operating system is alerted to keep a display screen active based on the first detection performed in Step 380.

In Step 384, sometime later, the fingerprint sensor of an electronic device performs a second detection that determines that the finger detected in Step 380 is no longer interacting with the fingerprint sensor.

In Step 386, based on the second detection, the operating system is alerted to transition the display screen out of the active state. In one or more embodiments disclosed herein, the alert to the operating system causes the operating system to start transitioning the display screen from the active state. In one or more embodiments disclosed herein, the alert to the operating system merely alerts the operating system to cease keeping the screen active, and instead revert to its configured behavior relating to the display screen when no finger is interacting with the fingerprint sensor. For example, the device may be configured to dim the display screen after twenty seconds, and put the display screen in a sleep state after forty seconds.

FIG. 4.1 and FIG. 4.2 show an example electronic device, mobile device (400), having a display screen (404) and a fingerprint sensor (402) in accordance with one or more embodiments disclosed herein. The following example is for explanatory purposes only and not intended to limit the scope of embodiments disclosed herein.

Turning to FIG. 4.1, consider a scenario in which the display screen of the mobile device is currently in an active state, and displaying a top news story (406) that includes top news story text (408). Previously, a user of the mobile device (400) has enrolled a fingerprint corresponding to finger (410) via fingerprint enrollment process. As such, one or more fingerprint data units corresponding to the fingerprint have been processed by a processing system (not shown) and stored in a fingerprint data repository (not shown) of the mobile device (400).

In such a scenario, the mobile device detects that finger (410) is interacting with the fingerprint sensor (402) and has an enrolled fingerprint, and thus leaves the display screen (404) in an active state. Additionally, a timer is set for performing a future fingerprint sense action.

Once the timer expiration is detected, the mobile device again performs a fingerprint sense action to determine that the finger (410) is still interacting with the fingerprint sensor (402), and thus alerts the operating system to keep the display screen (404) in an active state so that the user of the mobile device (400) may continue to read the top news story (406).

Sometime later, as shown in FIG. 4.2, the finger of the user stops interacting with the fingerprint sensor (402). Accordingly, once the most recently set fingerprint sense action timer expires, the mobile device will detect that there is no enrolled fingerprint interacting with the fingerprint sensor (202). Therefore, the operating system is alerted to transition the display screen (404) from the active state to a sleep state.

In the embodiment shown in FIGS. 4.1-4.2, the fingerprint sensor 402 is disposed outside of an active area of the display screen 404. This allows the user to maintain the display screen 404 in an active state while reading viewing the information on the display, without blocking the displayed information with the finger 410. The fingerprint sensor 402 is shown disposed in an area below the active area of the display screen 404. Alternatively, the fingerprint sensor 402 may be disposed on a back or side of the mobile device 400.

While the embodiments disclosed herein have been described with respect to a limited number of embodiments, those skilled in the art, having benefit of this disclosure, will appreciate that other embodiments can be devised which do not depart from the scope of embodiments disclosed herein. Accordingly, the scope embodiments disclosed herein should be limited only by the attached claims.

What is claimed is:

1. A system comprising:
a fingerprint sensor coupled to a processing system and configured to periodically perform a check for a presence of a finger; and
the processing system configured to:
determine, after the finger is detected interacting with the fingerprint sensor, the finger comprises an enrolled fingerprint using a first set of matching thresholds;
alert, in response to the finger comprising the enrolled fingerprint, an operating system to cause a display screen to be in an active state,
wherein the display screen is located on a separate part of an exterior of an electronic device than a part of the exterior comprising the fingerprint sensor;
perform a future finger sense action to detect that the finger is still interacting with the fingerprint sensor, the future finger sense action comprising:
determining the finger comprises the enrolled fingerprint using a second set of matching thresholds that are less stringent than the first set of matching thresholds; and
report to the operating system, based on determining that the finger comprises the enrolled fingerprint using the second set of matching thresholds, that the display screen should remain in the active state,
wherein the operating system causes the display screen to be in the active state based on the report.

2. The system of claim 1, wherein the processing system is further configured to:
perform an additional future finger sense action to detect if the finger is still interacting with the fingerprint sensor;
determine via the additional future finger sense action, that the finger is no longer interacting with the fingerprint sensor;
alert the operating system, based on detecting that no finger is interacting with the fingerprint sensor, that the display screen should transition to a sleep state,
wherein the operating system transitions the display screen to the sleep state based on the alert.

3. The system of claim 1, further comprising:
a fingerprint data repository coupled to the processing system and configured to store a plurality of fingerprint data units, each corresponding to at least a portion of the enrolled fingerprint or any other fingerprint,
wherein the processing system, to perform the future finger sense action, is further configured to:
obtain a fingerprint sensor output from the fingerprint sensor;
perform a comparison between the fingerprint sensor output and the plurality of fingerprint data units; and
determine, based on the comparison, that at least a portion of the plurality of fingerprint data units matches the fingerprint sensor output.

4. The system of claim 2, wherein the transition to the sleep state comprises an intermediate transition of the display screen to a dimmed state where the display screen is dimmed before the transition to the sleep state.

5. The system of claim 3, wherein the processing system, the fingerprint data repository, and the fingerprint sensor are part of a secure operating environment separate from an operating environment in which the operating system executes.

6. An electronic system comprising:
a display screen located on a first part of an exterior of an electronic device and associated with a high power active state and a low power sleep state;
a secure operating environment comprising:
a fingerprint sensor coupled to a first processing system and configured to periodically perform a check for a presence of a finger, the fingerprint sensor located on a second part of the exterior of the electronic device, the second part separate from the first part; and
the first processing system configured to:
determine, after the finger is detected interacting with the fingerprint sensor, the finger comprises an enrolled fingerprint using a first set of matching thresholds;
alert, in response to the finger comprising the enrolled fingerprint, an operating system to cause a display screen to be in the active state based on a detection of the finger;
perform a future finger sense action to detect that the finger is still interacting with the fingerprint sensor, the future finger sense action comprising:
determining the finger comprises the enrolled fingerprint using a second set of matching thresholds that are less stringent than the first set of matching thresholds; and
report to the operating system, based on determining that the finger comprises the enrolled fingerprint using the second set of matching thresholds, that the display screen should remain in the active state; and
an operating environment coupled to the secure operating environment and to the display screen and comprising:
a second processing system; and
the operating system executing on the second processing system and configured to causes the display screen to be in the active state based on the report.

7. The electronic system of claim 6, wherein the first processing system is further configured to:

perform an additional future finger sense action to detect if the finger is still interacting with the fingerprint sensor;
determine via the additional future finger sense action, that the finger is no longer interacting with the fingerprint sensor;
alert the operating system, based on detecting that no finger is interacting with the fingerprint sensor, that the display screen should transition to the sleep state,
wherein the operating system transitions the display screen to the sleep state based on the alert.

8. The electronic system of claim 7, wherein the secure operating environment further comprises:
a fingerprint data repository coupled to the first processing system and configured to store a plurality of fingerprint data units, each corresponding to at least a portion of the enrolled fingerprint,
wherein the first processing system, to perform the additional future finger sense action, is further configured to:
obtain a fingerprint sensor output from the fingerprint sensor;
perform a comparison between the fingerprint sensor output and each of the plurality of fingerprint data units; and
determine, based on the comparison, that none of the plurality of fingerprint data units matches the fingerprint sensor output.

9. The electronic system of claim 7, wherein the transition to the sleep state comprises an intermediate transition of the display screen to a dimmed state where the display screen is dimmed before the transition to the sleep state.

10. The electronic system of claim 8, wherein the first processing system, in order to perform the future finger sense action, is further configured to:
obtain, via the fingerprint sensor, fingerprint information corresponding to the enrolled fingerprint;
obtain a fingerprint data unit of the plurality of fingerprint data units from the fingerprint data repository; and
make a determination that the display screen should remain in the active state based on detecting that the fingerprint information matches the fingerprint data unit.

11. A method comprising:
performing a check to detect a presence of a finger on a fingerprint sensor;
determining the finger comprises an enrolled fingerprint using a first set of matching thresholds;
alerting, in response to the finger comprising the enrolled fingerprint, an operating system to cause a display screen to be in an active state, wherein the display screen is located on a separate part of an exterior of an electronic device than a part of the exterior comprising the fingerprint sensor;
performing a future fingerprint sense action to detect that the finger is still interacting with the fingerprint sensor, the future fingerprint sense action comprising:
determining the finger comprises the enrolled fingerprint using a second set of matching thresholds that are less stringent than the first set of matching thresholds; and
reporting to the operating system, based on determining that the finger comprises the enrolled fingerprint using the second set of matching thresholds, that the display screen should remain in the active state,
wherein the operating system causes the display screen to be in the active state based on the report.

12. A system associated with a display screen, comprising:
a fingerprint sensor coupled to a processing system and configured to detect a finger interacting with the fingerprint sensor; and
the processing system configured to:
receive, while the display screen is in an active state and from the fingerprint sensor, a first detection that the finger is interacting with the fingerprint sensor;
determine the finger comprises an enrolled fingerprint using a set of matching thresholds that are less stringent than a different set of matching thresholds used to place the display screen in the active state;
send, based on the finger comprising the enrolled fingerprint, a first alert to an operating system to cause a display screen to remain in the active state,
wherein the display screen is located on a separate part of an exterior of an electronic device than a part of the exterior comprising the fingerprint sensor;
receive, after sending the first alert, a second detection from the fingerprint sensor that the finger is no longer interacting with the fingerprint sensor; and
send a second alert to the operating system to revert to a configured mode of operation related to the display screen.

13. The system of claim 12, further comprising:
a fingerprint data repository coupled to the processing system and configured to store a plurality of fingerprint data units, each corresponding to at least a portion of the enrolled fingerprint,
wherein the processing system is further configured to:
obtain a fingerprint sensor output from the fingerprint sensor;
perform a comparison between the fingerprint sensor output and each of the plurality of fingerprint data units; and
determine, based on the comparison, that none of the plurality of fingerprint data units matches the fingerprint sensor output.

14. The system of claim 12, wherein the configured mode of operation comprises transitioning the display screen to a dimmed state after a first time period, and then to an inactive state after a second time period.

15. A system associated with a display screen, comprising:
a finger sensing means for detecting a finger interacting with an electronic device, the finger sensing means located on a first part of an exterior of the electronic device;
a means for receiving, while the display screen is in an active state, a first detection that the finger is interacting with the electronic device;
a means for determining the finger comprises an enrolled fingerprint using a set of matching thresholds that are less stringent than a different set of matching thresholds used to place the display screen in the active state;
a means for sending, based on the finger comprising the enrolled fingerprint, a first alert to an operating system to cause a display screen to remain in the active state based on the first detection, the display screen located on a second part of the exterior of the electronic device, the second part separate from the first part;
a means for receiving, after sending the first alert, a second detection that the finger is no longer interacting with the electronic device; and a means for sending a second alert to the operating system to revert to a configured mode of operation related to the display screen.

16. The system of claim 15, wherein the configured mode of operation comprises transitioning the display screen to a dimmed state after a first time period, and then to an inactive state after a second time period.

\* \* \* \* \*

UNITED STATES PATENT AND TRADEMARK OFFICE
CERTIFICATE OF CORRECTION

Page 1 of 1

PATENT NO. : 10,289,885 B2
APPLICATION NO. : 15/640254
DATED : May 14, 2019
INVENTOR(S) : Anna Ostberg It is certified that error appears in the above-identified patent and that said Letters Patent is hereby corrected as shown below:

In the Claims

Claim 6, Column 22, Line 64, the word "causes" should read -- cause --.

Signed and Sealed this
Twenty-eighth Day of April, 2020

Andrei Iancu
*Director of the United States Patent and Trademark Office*